(12) United States Patent
Tan et al.

(10) Patent No.: US 7,506,363 B2
(45) Date of Patent: Mar. 17, 2009

(54) METHODS, SYSTEMS, AND COMPUTER PROGRAM PRODUCTS FOR USER AUTHORIZATION LEVELS IN AGGREGATED SYSTEMS

(75) Inventors: Yih-Shin Tan, Raleigh, NC (US); Shouhui Wang, Beijing (CN)

(73) Assignee: Ineternational Business Machines Corporation, Armonk, NY (US)

( * ) Notice: Subject to any disclaimer, the term of this patent is extended or adjusted under 35 U.S.C. 154(b) by 880 days.

(21) Appl. No.: 10/926,550

(22) Filed: Aug. 26, 2004

(65) Prior Publication Data
US 2006/0059564 A1 Mar. 16, 2006

(51) Int. Cl.
*G06F 21/00* (2006.01)
(52) U.S. Cl. .......................... 726/4; 726/21
(58) Field of Classification Search ............... 726/28, 726/4, 8, 17, 21, 29
See application file for complete search history.

(56) References Cited

U.S. PATENT DOCUMENTS 7,324,972 B1 * 1/2008 Oliver et al. ............... 705/40
2001/0052077 A1 12/2001 Fung et al. ................. 713/184
2002/0194297 A1 12/2002 Jen et al. ................... 709/217
2002/0199188 A1 12/2002 Sie et al. ..................... 725/35
2003/0154405 A1 8/2003 Harrison .................... 713/201
2003/0220876 A1 11/2003 Burger et al. ............... 705/50
2004/0054916 A1 * 3/2004 Foster et al. ............... 713/200
2005/0197859 A1 * 9/2005 Wilson et al. ................. 705/2
2006/0104306 A1 * 5/2006 Adamczyk et al. .......... 370/466

OTHER PUBLICATIONS

Ross, et al.; "A composable Framework for Secure Multi-Modal Access to Internet Services from Post-PC Devices," Mobile Networks and Applications 7; pp. 389-407 (2002).
Reiner Kraft; "Designing a Distributed Accerss Control Processor fort Network Services on the Web," IBM Almaden Research Center; ACM Workshop on XML Security;pp. 36-52 (Nov. 22, 2002).

* cited by examiner

*Primary Examiner*—Gilberto Barron, Jr.
*Assistant Examiner*—Samson B Lemma
(74) *Attorney, Agent, or Firm*—Joseph Bracken; Dillon & Yudell LLP

(57) ABSTRACT

Services may be provided in a networked applications services environment by authorizing access to different services from different service providers included in an aggregated system of service providers based on different aggregated authorization levels associated with users. Related systems and computer program products are also disclosed.

15 Claims, 6 Drawing Sheets

FIG. 5

| USER | AUTHORIZATION LEVEL | | |
|------|---|---|---|
| A | 1 | GROUP 1 (R) | GROUP 2 — | GROUP 3 — |
| B | 2 | GROUP 1 (R/W) | GROUP 2 (R) | GROUP 3 — |
| C | 3 | GROUP 1 (R/W) | GROUP 2 (R/W) | GROUP 3 (R/W) |

METHODS, SYSTEMS, AND COMPUTER PROGRAM PRODUCTS FOR USER AUTHORIZATION LEVELS IN AGGREGATED SYSTEMS

FIELD OF THE INVENTION

This invention relates to methods, systems, and computer program products for processing information, and more particularly, to methods, systems, and computer program products for processing information in a networked computer environment.

BACKGROUND

It is known to provide aggregated services via a single "sign-on" where a user may access the services after having their identity authenticated via the sign-on. As used herein, the term "authenticated" refers to a determination that the user is who he/she is purported to be using, for example, a username and password associated with the user. However, in some single sign-on aggregated systems, a user may still be required to separately gain access to each of the services provided by the aggregated system before use may be made of the services. For example, if a user signs-on an aggregated system to access two different services provided by two different service providers, the user may be authenticated by a sign-on, but may still need authorization to access the services by providing further information to one or the other of the two services.

Two examples of such single sign-on aggregated systems discussed above are the .NET Passport system ("Passport") made available by Microsoft, Inc. of Redmond, Wash. and the Liberty system ("Liberty") made available by Sun MicroSystems, Inc. of Mountain View, Calif. The Passport system provides for authentication of a user by creating a set of credentials that enable the user to sign-on to any of the services (such as that offered by a website) that supports the Passport service. An exemplary representation of the Passport system is shown in FIG. 1, including a Passport server 115 and three service providers 110A-C each of which supports the Passport system 100. According to FIG. 1, a user can access the Passport system using, for example, a computer 101 by signing-on to the service provider 110A over a link 105. The service provider 110A redirects the user's sign-on to the Passport server 115 via a link 120, whereupon the user signs-on to the Passport server 115. The Passport server 115 can authenticate the user's sign-on information using locally accessible user identity information 130. If the user's sign-on information is authenticated, the user is redirected from the Passport server 115 back to the service provider 110A via a link 135, whereupon service provider 110A allows the user to access services provided thereon. It will be understood that service providers 110B and C may operate similarly.

An exemplary illustration of the Liberty system is shown in FIG. 2, including service providers 210A-C and an identity server 214. In particular, a user can access services via the Liberty system 200 over a link 205 to the service provider 210A using, for example, a computer 201. The user's sign-on to the service provider 210A is redirected to the identity server 214 via a link 220 whereupon the user signs on using identity information 230 available to the identity server 214. The identity server 214 uses the identity information 230 to determine whether the user (identified by the identity information 206A-C) is an authentic user known to the service provider 210A over a link 222, 210B over a link 223, or 210C over a link 224. If the identity server 214 is able to verify the authenticity of the user, the user is redirected back to the service provider 210A via link 235, whereupon the user is able to access the services via service provider 210A.

Notwithstanding the authentication services provided by aggregated systems such as Passport and Liberty, there is a need for further improvement in providing authentication and authorization transparent services via aggregated systems. Each service provider in an aggregated system does not necessarily know about the authorization levels, user identities, and services offered by the others. Accordingly, it may be difficult to authorize a user subscribed to one service provider to use services offered by others with proper levels of granularity.

SUMMARY

Embodiments according to the invention can provide methods, systems, and computer program products for user authorization levels in aggregated systems. Pursuant to these embodiments, a method of providing services in a networked applications services environment can be performed by authorizing access to different services from different service providers included in an aggregated system of service providers based on different aggregated authorization levels associated with users.

In some embodiments according to the invention, authorizing can further include allowing access to a first service from a server and preventing access to a second service from the server based on a first level of authorization and allowing access to the second service based on a second level of authorization. In some embodiments according to the invention, the first level of authorization can be an aggregated system authorization level in the aggregated system mapped from a local system authorization level.

In some embodiments according to the invention, the first service can be a first application accessible to the user based on a first authorization level and the second service can be a second application accessible to the user based on a second authorzation level.

In some embodiments according to the invention, authorizing can further include allowing read-only access to a service from a server based on a first level of authorization and allowing read/write access to the service from the server based on a second level of authorization.

In other embodiments according to the invention, the different services can be different applications accessible to users based on authorization levels associated therewith. In further embodiments according to the invention, authorizing is performed prior to access by a user.

In other embodiments according to the invention, authorizing can include providing an authorization level for access to services in the system to an interface of the aggregated system with an authentication responsive to an access by a user via the interface. In still other embodiments according to the invention, the authorization level and the authentication are provided to the interface responsive to a single request for authentification from the interface.

In still other embodiments according to the invention, methods of providing services in a networked applications services environment can be provided by receiving a request for authentification of a user from an interface to an aggregated system of service providers. A level of authorization can be determined associated with the user to access services in the aggregated system. A user authentification for the user and the level of authorization associated therewith can be provided to the interface.

In still other embodiments according to the invention, the level of authorization can be a first level of authorization for a first application available via a first service provider in the aggregate system and a second level of authorization for a second application available via a second provider in the aggregate system. In other embodiments according to the invention, the first level of authorization can be read-only access to the first application and the second level of authorization can be read/write access to the second application.

In some embodiments according to the invention, methods of providing services in a networked applications services environment can include registering service providers in an aggregated system of service providers including services available from the service providers. A request can be received from a user for access to the aggregated system of service providers at the interface to the aggregated system. An authentification can be requested for the user from a service provider included in the aggregated system having a profile associated with the user. An authentification can be received for the user and an authorization level associated therewith.

BRIEF DESCRIPTION OF THE DRAWINGS

FIG. 5 is a table illustrating different levels of authorization for use of applications by different users according to some embodiments of the invention.

DETAILED DESCRIPTION OF EMBODIMENTS ACCORDING TO THE INVENTION

Figure 1:
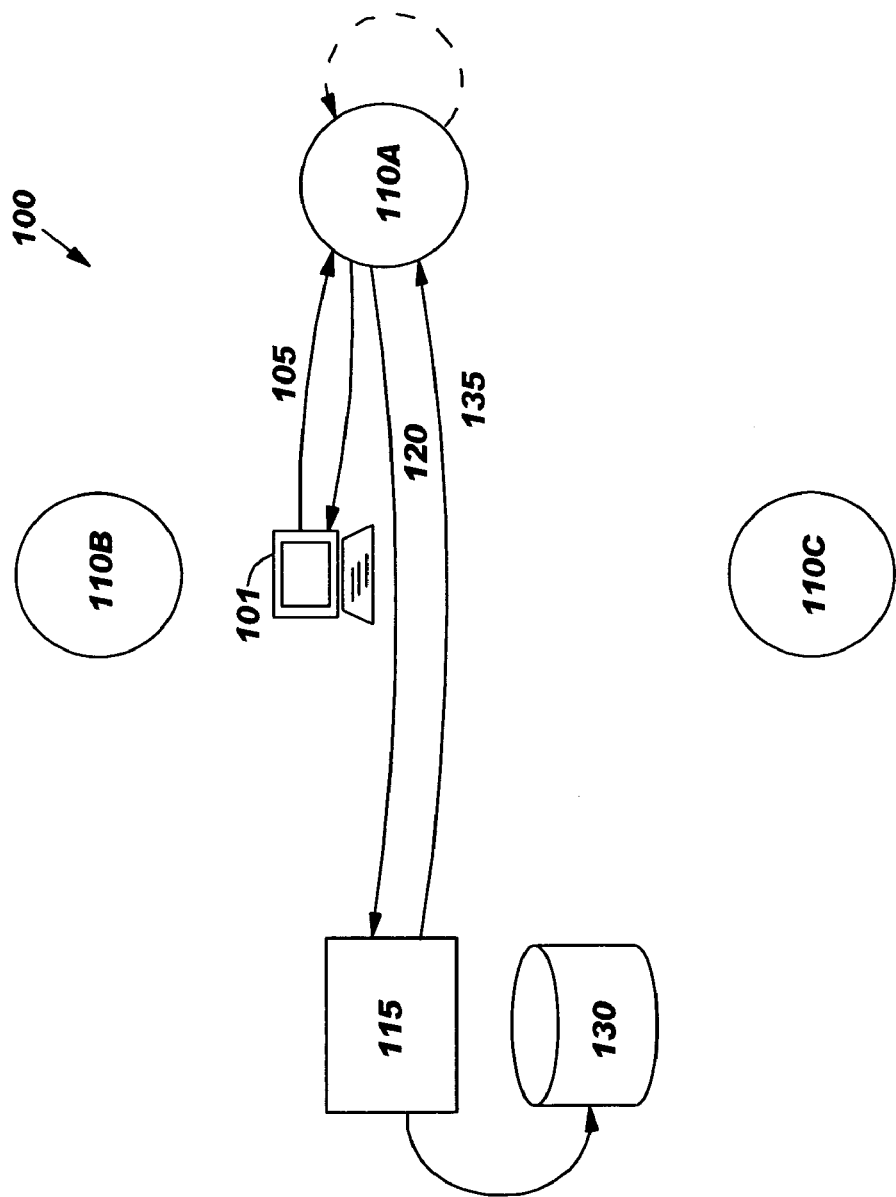
FIG. 1 is an exemplary illustration of a Passport system.
Figure 2:
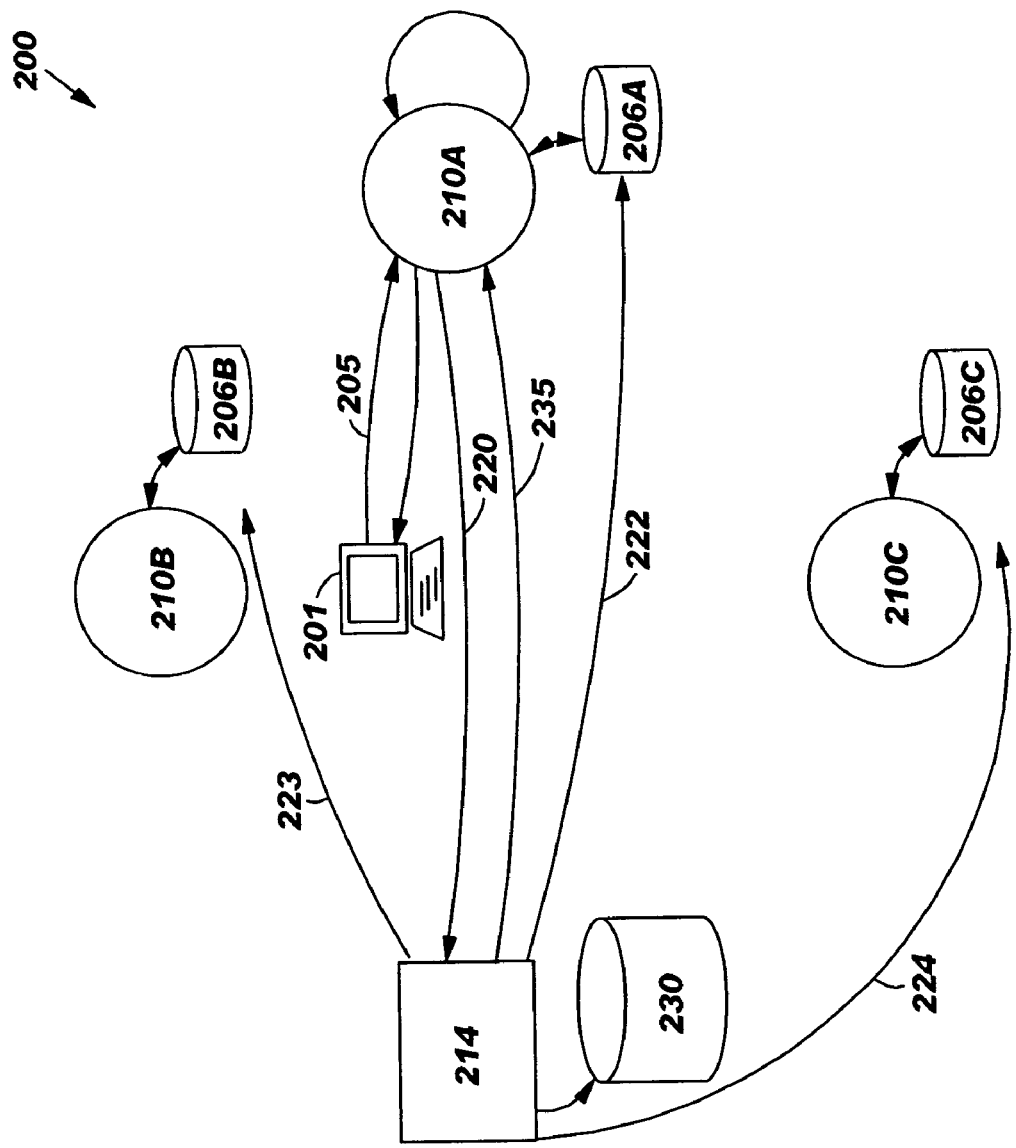
FIG. 2 is an exemplary illustration of the Liberty system.

The present invention is described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers and reference designators refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The present invention is described below with reference to block diagrams and flowchart illustrations of methods, systems and computer program products according to embodiments of the invention. It is understood that each block of the block diagrams and/or flowchart illustrations, and combinations of blocks in the block diagrams and a flowchart illustration, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

As used herein, the term "service provider" can include a server that offers one or more services via, for example, Web pages as part of a Web site. The Web site can include a related collection of files that includes a beginning file called a home page. From the home page, a user can access other files and applications at the Web site. A large Web site may utilize a number of servers, which may or may not be different and may or may not be geographically-dispersed. For example, the Web site of the International Business Machines Corporation (www.ibm.com) consists of thousands of Web pages and files dispersed over multiple Web servers in locations world-wide.

In the example above the web pages can further be replaced by web services in an environment that is set for programmatic access of the applications independent of GUI methods. Web services can provide WSDL, SOAP, and XML message standards such that a program can access the applications as represented by the standards on the Web site.

Embodiments according to the invention can operate in a logically separated client side/server side computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser.

The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. In the SOAP model the request and response are communicated through XML message exchange. It will be understood that the server can respond to requests from more than one client.

As used herein, an "aggregated system" includes" services that are provided by otherwise separate service providers. In such aggregated systems, a user may access some or all of the services offered by the different service providers once the user has been authenticated and authorized (as described herein in greater detail). For example, an aggregated system may include service providers that offer medical research services, news services, and data mining services. It will be understood that the separate service providers can be service providers that can be subject to separate subscription service or have separate administrative authorization. Conventionally, a user may need to be separately authorized to access each of these services. However, in an aggregated system, the user may access at least some of the services in the system after being authorized once.

As described herein in greater detail, embodiments according to the invention may provide authorization to access different services in an aggregated system of service providers based on different aggregated authorization levels associated with users of the system. For example, in an aggregated system offering different types of on-line research tools, a user with a first authorization level might be granted access to a limited number of applications included in the aggregated system whereas a second user (with a higher level of authorization) might have access to more applications. Moreover, the second user may have read/write authorization in some of the applications whereas the first user may be limited to read-only authorization.

The different levels of authorization associated with the users can be assigned during a registration process (for example, when a service is added to the aggregated system). The registration process can involve communication between an interface to the aggregated system and each of the service providers to be included in the aggregated system. In some embodiments according to the invention, during the registration process the interface to the aggregated system may provide a profile of the different authorization levels that are allowed within the aggregated system. For example, the interface may notify a new service provider that three different levels of authorization are allowed in the aggregated system. The service provider can act upon the authorization levels provided by the interface by mapping the service provider's local authorization levels to the different levels of authorization provided in the aggregated system.

The approaches generally described above may allow for improved extensibility on the aggregated system (i.e., where new services providers are added to the system) and may reduce overhead as communications between the service providers and the interface may be reduced in view of the registration that can occur prior to access by a user. In some other embodiments according to the invention, during the registration process the service provider can inform the interface of the user profiles and provide a categorical map to assign the actual authorization level later based on the identity parameter values the provider returns to the interface when a user requests access to the services.

Figure 3:
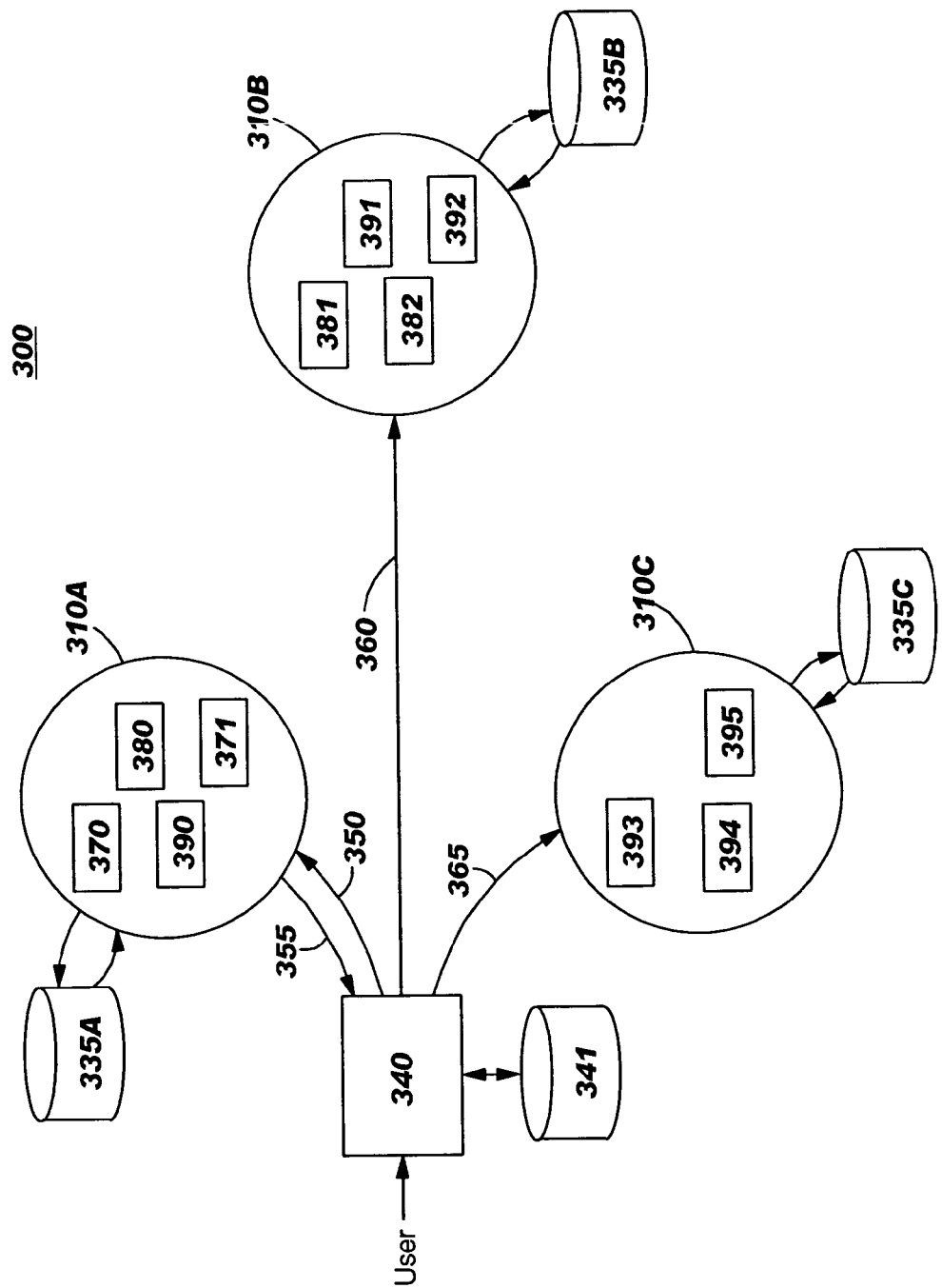
FIG. 3 is an exemplary illustration of an aggregated system of service providers according to some embodiments of the invention.

FIG. 3 is an exemplary illustration of an aggregated system of service providers including authorization levels according to some embodiments of the invention. In particular, an aggregated system 300 includes service providers 310A-C and an aggregated system interface 340 through which users can access the aggregated system 300. Each of the service providers 310A-C has locally associated user identity information 335A-C that reflects users that are known to the respective service provider 310A-C through, for example, a subscription to services provided by the service provider. For example, a service provider may offer on-line research tools that are available via a subscription. Moreover, different subscriptions may imply the different authorization levels for the known users or subscribers. For example, a first user known to service provider 310A may have a first authorization level entitling the user to access only one of the applications provided by the service provider 310A. In contrast, a second user may have a second level of authorization that is higher than the first level of authorization that entitles the second user to access all of the applications offered by the service provider 310A.

In operation, a user can access the aggregated system 300 via the interface 340. According to FIG. 3, the user signs on to the aggregated system 300 via the interface 340 to access services provided by the aggregated system 300. In response, the interface 340 requests authorization level information from the service provider with whom the user is associated. In particular, the interface 340 may have access to identity information 341 that indicates which service providers each of the known users of the aggregated system 300 is associated with and user preference data. For example, some of the users of the aggregated system 300 may have subscriptions with service provider 310A, whereas others may have subscriptions with service providers 310B and 310C separately.

The associated service provider responds to the request for authorization level information by accessing the local authorization level information 335A-C and determines the authorization level for the user requesting access to the aggregated system 300. For example, the service provider 310A is contacted via link 350 to provide the authorization level information for the user requesting access to the interface 340 via a link 355. The authorization level information may be beyond conventional read or write access, administrator or power user access, etc. as such information may not be understood by a different system. For example, the authorization level information can include metadata that describes the characteristics of the local user such as the type of services authorized, skill family and organizational responsibilities. It will be understood that the local authorization level for the user can be used by the interface 340 to authorize the user to access applications provided by other service providers in the aggregated system 300. For example, users having an appropriately high level of authorization (that has subscribed to service provider 310A) may be allowed to access applications provided by services providers 310B and 310C. It will be understood that in addition to the authorization level information, authentication information may also be provided to the interface 340. For example, the service provider 310A may indicate that the user requesting authorization for access to the services is, in-fact, an authentic subscriber to the service provider 310A as well as having the level of authorization associated with the authenticated user's subscription.

Upon receipt of the authorization level information at the interface 340, the user can be authorized to access applications associated with the user's aggregated level of authorization. For example, according to FIG. 3, if the user has a level one authorization, the user may be authorized to access application 370 and 371 available via service provider 310A but may not access any of the other applications available within the aggregated system 300. In contrast, if the user has a level two authorization, the user may be authorized to access the applications 370, 371, and 380 available via service provider 310A and applications 381 and 382 available via service provider 310B. Furthermore, if the user's authorization level is level three, the user may be authorized to access applications 370, 371, 380 and 390 available via service provider 310A, applications 381, 382, 391 and 392 available via service provider 310B, and applications 393, 394, and 395 available via service provider 310C. It will be understood that although three service provider are shown in FIG. 3, fewer or more service providers may be included in aggregated systems according to some embodiments of the invention.

Figure 4:
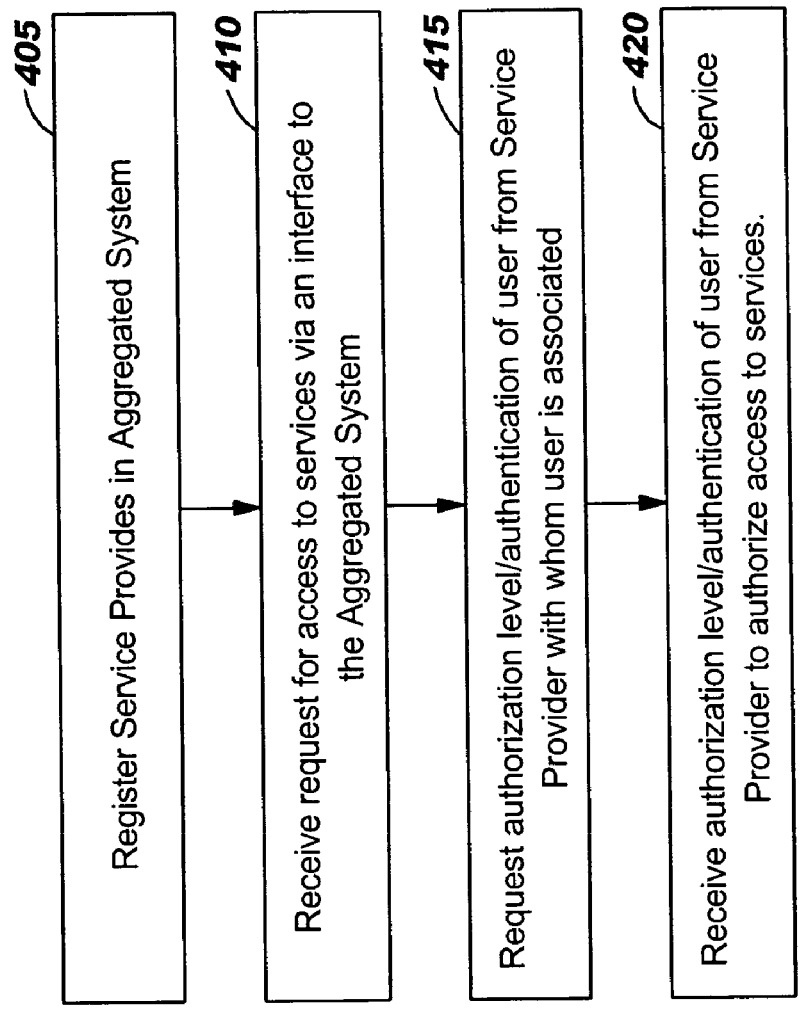
FIG. 4 is a flowchart that illustrates operations of an aggregated system of service providers according to some embodiments of the invention.

FIG. 4 is a flowchart illustrating operations of aggregated systems including authorization levels according to some embodiments of the invention. According to FIG. 4, the registration of service providers in the aggregated system can occur prior to access by users (block 405). It will be understood that the registration of service providers can occur when a new service provider is added to the aggregated system, or when a service provider already included within the aggregated system has updated information, such as new applications that are now available for access via the aggregated system.

The information provided during the registration can enable the service provider (as well as the services provided thereon) to be accessible to users via the interface to the aggregated system. As discussed herein, in some embodiments according to the invention, the authorization level for a user is determined by identity information returned by the service provider compared with the categorical authorization parameter values specified at the registration time or, as in other embodiments according to the invention, the aggregated system may provide predetermined authorization levels which the service provider can use to map a local authorization level to an aggregated system authorization level later.

The aggregated system receives a request for access to services via an interface to the aggregated system (block 410). As discussed herein, the interface can have local access to identity information that includes known users for each of the associated service providers. The identity information may be obtained from the service providers, for example, during the user authentication process. The identity information can also include user preference data such as preferred language, organizational information such as which departments or organization the user is employed within, job classification information, and other types of information which may also be provided as part of the user authentication process.

Upon receiving a request for access, the interface to the aggregated system can request authorization information and/or authentication (identity) information from a service provider that is associated with the user (block 415). As described herein, the service provider can determine the authorization level based on authorization level information that is locally available to the service provider and the provided aggregated system authorization level. The authorization level information can be based upon a subscription which the user has with the service provider which may entitle the user to use some or all of the applications associated with the service provider and, moreover, may provide further authorization levels to the user such as read-only or read/write authorization levels for particular applications.

The service provider transmits the authorization level information and/or authentication information to the interface which authorizes the user to access services in the aggregated system based on the authorization level provided or the identity information (block 420). As described herein, the different authorization levels associated with different users may enable some users to access applications which are not available to users having a lower level of authorization. Furthermore, some users with a relatively high level of authorization may have read/write authorization to, for example, modify or update data accessed via one of the applications.

FIG. 5 is an exemplary table illustrating different authorization levels for different users according to some embodiments of the invention. According to FIG. 5, users A, B, and C (from one service provider) each have different authorization levels which entitle the users to access different applications included within the aggregated system shown, for example, in FIG. 3. Moreover, each of the authorization levels includes authorization levels which are specific to each of the applications included in the aggregated system. For example, user A has an associated authorization level "1" which entitles user A to access group 1 applications 370 and 371 available via service provider 310A shown in FIG. 3. Moreover, user A's authorization for access to these applications is limited to read-only. Accordingly, user A may only view data accessed with applications 370 and 371 on service provider 310A.

In contrast, user B has an authorization level "2" which entitles user B to access group 1 applications 370 and 371 available via service provider 310A. User B is also authorized to access group 2 applications 380, 381 and 382 available via service provider 310B as shown in FIG. 3. Furthermore, user B's authorization level allows read/write access to data via applications 370 and 371, whereas access to applications 380, 381 and 382 is limited to read-only.

In further contrast to users A and B, user C has a relatively high authorization level ("3") which entitles user C to access all of the applications described above in reference to users A and B as well as group 3 applications 391 and 392 available via service provider 310B and applications 393, 394, and 395 available via service provider 310C. Furthermore, the authorization level of user C also enables user C to read and write any of the data accessed via any of these applications. Therefore, as described above, the different authorization levels can authorize different users to have access to different services based on the different authorization levels associated with the users.

Figure 6:
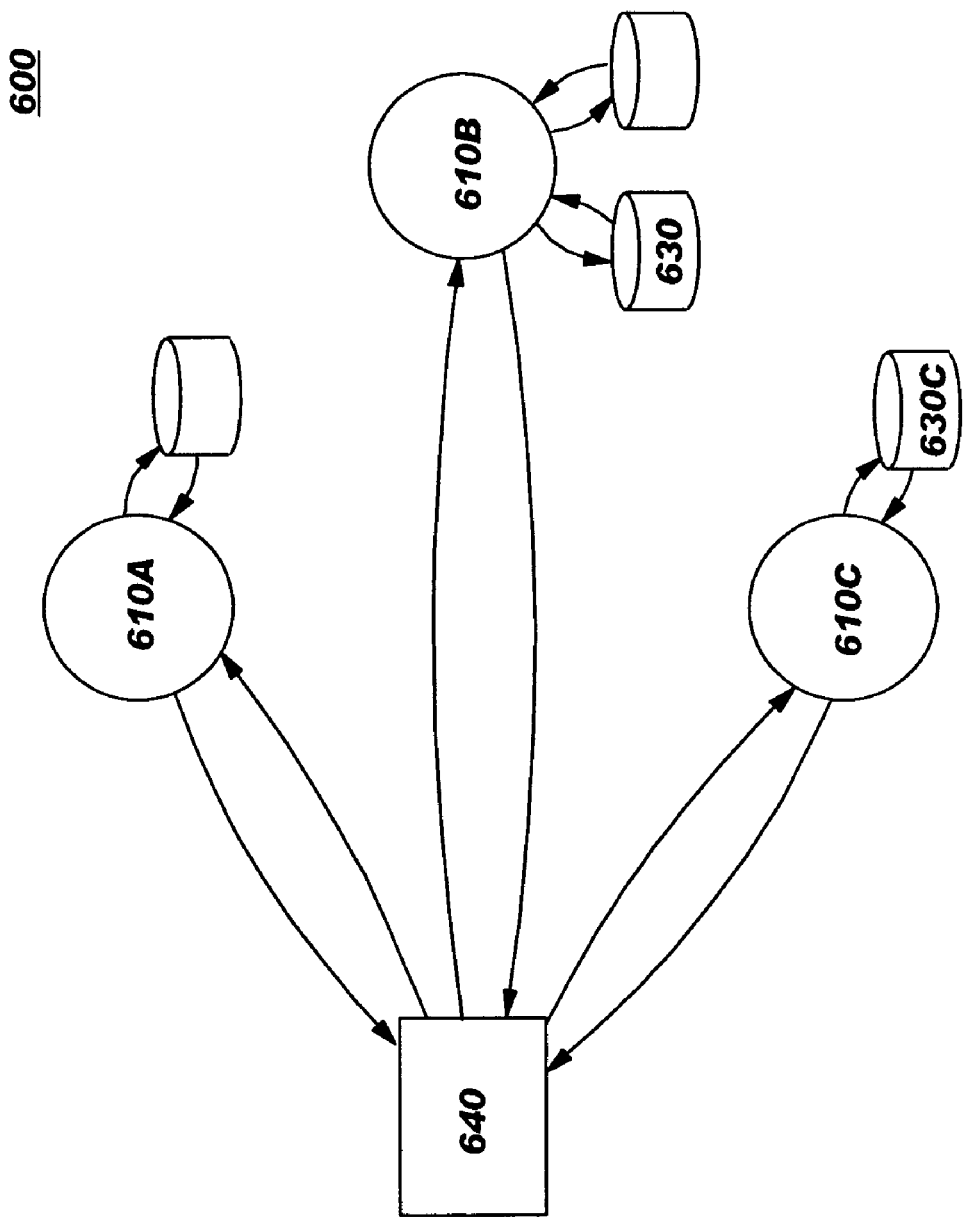
FIG. 6 is a schematic illustration of a registration process prior to an access to the aggregated system according to some embodiments of the invention.

As described above, prior to access by a user to the aggregated system, the service providers may undergo a registration process whereby authorization levels can be determined categorically for all users from a service provider in advance so that, for example, communication regarding authorization levels and authentication may be reduced. According to FIG. 6, an aggregated system 600 includes an interface 640 thereto and service providers 610A-C which can provide applications to be accessed by users of the aggregated system 600. Furthermore, each of the service providers 610A-610C has access to local identity information for users associated with the respective service provider. For example, each of the service providers may provide stand-alone services (in addition to being part of the aggregated system 600) so that a user may subscribe to the service provider and, therefore, may access the aggregated system 600 through the interface 640.

In some embodiments according to the invention, during the registration process the service providers 610A-C provide a list of applications available from each of the respective service providers as well as the factors for determining the authorization levels that can be associated with access to those applications. For example, the service provider 610A may provide a list of services available therefrom along with the different levels of authorization that entitle a user to access those applications including read/write or read-only type authorization levels. Accordingly, during the registration process, the service providers 610A-C can provide what aggregated authorization levels are supported by the respective service provider along with what each of the authorization levels specifically authorizes an associated user to do within the aggregated system 600. For example, if service provider 610A supports aggregated authorization levels "1", "2", and "3", the service provide 610A can indicate in the authorization level information that level "1" authorizes read-only access to a certain type of application available, level "2" authorizes access to a certain type of application available on service providers 610A and 610B at various read-only and read/write authorizations levels, and level "3" authorizes the user to access any and all applications available via the service provider 610A-C with read/write authorization levels.

In other embodiments according to the invention, the interface 640 provides predetermined authorization levels that are recognized within the aggregated system 600 to the service providers. Therefore, at completion of registration, each of the service providers 610A-C includes a list of what authorization levels are valid for users accessing the aggregated system 600. In operation, when a user accesses the aggregated system 600, the interface 640 requests authorization information from a respective service provider 610A-C associated with the user requesting access. In response, the service provider 610A-C can map identity information associated with the user to one of the predetermined authorization levels provided by the interface 640 during the registration process.

It will be understood that the authorization levels in this type of registration process can operate to provide the functions described herein.

As described herein, embodiments according to the invention may provide authorization to access different services in an aggregated system of service providers based on different aggregated authorization levels associated with users of the system. For example, in an aggregated system offering different types of on-line research tools, a user with a first authorization level might be granted access to a limited number of applications included in the aggregated system whereas a second user (with a higher level of authorization) might have access to more applications. Moreover, the second user may have read/write authorization in some of the applications whereas the first user may be limited to read-only authorization.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of providing services in a networked applications services environment, comprising:
   authorizing access to different services provided via different service providers included in an aggregated system of service providers based on different aggregated authorization levels associated with users;
   allowing access to a first service provided via a server and preventing access to a second service provided via the server based on a first authorization level; and
   allowing access to the second service based on a second authorization level, wherein the first service comprises a first application accessible to the user based on the first authorization level and the second service comprises a second application accessible to the user based on the second authorization level.

2. A method according to claim 1 wherein the first authorization level comprises an aggregated system authorization level in the aggregated system mapped from a local system authorization level.

3. A method according to claim 1 wherein authorizing further comprises:
   allowing read-only access to the first service based on the first authorization level; and
   allowing read/write access to the second service based on the second authorization level.

4. A method according to claim 1 wherein the different services comprise different applications accessible to users based on authorization levels associated therewith.

5. A method according to claim 1 wherein authorizing is performed prior to access.

6. A method according to claim 1 wherein authorizing comprises providing an authorization level for access to services in the system to an interface of the aggregated system with an authentication responsive to an access by a user via the interface.

7. A method according to claim 6 wherein providing the authorization level and the authentication are provided to the interface responsive to a single request for authentication from the interface.

8. A method according to claim 1 carried out by a computer program product embodied in a computer readable storage medium.

9. A method according to claim 1 carried out by a system comprising:
a means for authorizing the access to the different services from different service providers included in the aggregated system of service providers based on different authorization levels associated with the user.

10. A method of providing services in a networked applications services environment, comprising:
receiving a request for authentication of a user from an interface to an aggregated system of service providers;
determining a level of authorization associated with the user to access services in the aggregated system; and
providing a user authentication for the user and the level of authorization associated therewith to the interface, wherein the level of authorization comprises a first authorization level for a first application available via a first service provider in the aggregated system and a second authorization level for a second application available via a second service provider in the aggregated system.

11. A method according to claim 10 wherein the first authorization level comprises read-only access to the first application and the second authorization level comprises read/write access to the second application.

12. A method of providing services in a networked applications services environment, comprising:
registering service providers in an aggregated system of service providers including services available from the service providers;
receiving a request from a user for access to the aggregated system of service providers at an interface to the aggregated system;
requesting an authentication for the user from a service provider included in the aggregated system having a profile associated with the user;
receiving an authentication for the user and an authorization level associated therewith;
determining the authorization level for the user at the service provider to indicate which services in the aggregated system are accessible to the user based on a subscription of the user associated with the service provider; and
allowing access to the services via the interface according to the authorization level, wherein the services correspond to respective applications.

13. A method according to claim 12 further comprising:
providing different levels of authorization available in the aggregated system from the interface to the service providers; and
determining which of the different levels of authorization is applicable to the user at the service provider to indicate which services in the aggregated system are accessible to the user.

14. A system for providing services in a networked applications services environment, comprising:
means for registering service providers in an aggregated system of service providers including services available from the service providers;
means for receiving a request from a user for access to the aggregated system of service providers at an interface to the aggregated system;
means for requesting an authentication for the user from a service provider included in the aggregated system having a profile associated with the user;
means for receiving an authentication for the user and an authorization level associated therewith;
means for determining the authorization level for the user at the service provider to indicate which services in the aggregated system are accessible to the user based on a subscription of the user associated with the service provider; and
means for allowing access to the services via the interface according to the authorization level, wherein the services correspond to respective applications.

15. A computer program product for providing services in a networked applications services environment, comprising:
a computer readable storage medium having computer readable program code embodied therein, the computer readable program product comprising:
computer readable program code configured to register service providers in an aggregated system of service providers including services available from the service providers;
computer readable program code configured to receive a request from a user for access to the aggregated system of service providers at an interface to the aggregated system;
computer readable program code configured to request an authentication for the user from a service provider included in the aggregated system having a profile associated with the user;
computer readable program code configured to receive an authentication for the user and an authorization level associated therewith;
computer readable code configured to determine the authorization level for the user at the service provider to indicate which services in the aggregated system are accessible to the user based on a subscription of the user associated with the service provider; and
computer readable code configured to allow access to the services via the interface according to the authorization level, wherein the services correspond to respective applications.

* * * * *